March 24, 1970     L. PRENCIPE     3,502,270
WATER DISCHARGE CONTROL FOR GARDEN HOSES
Filed Feb. 19, 1968
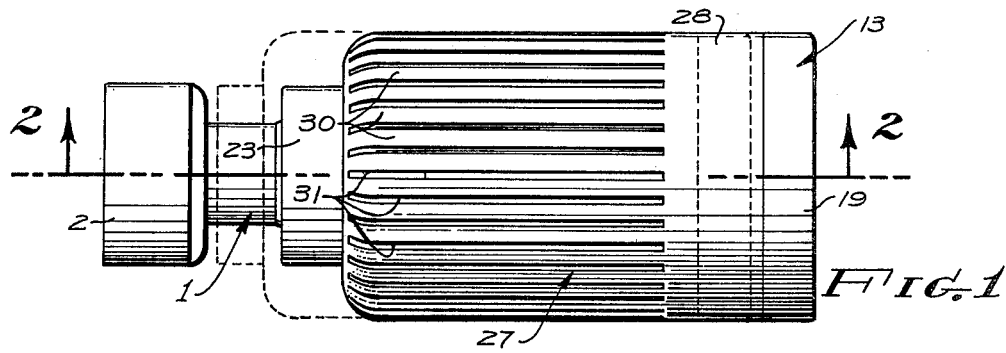
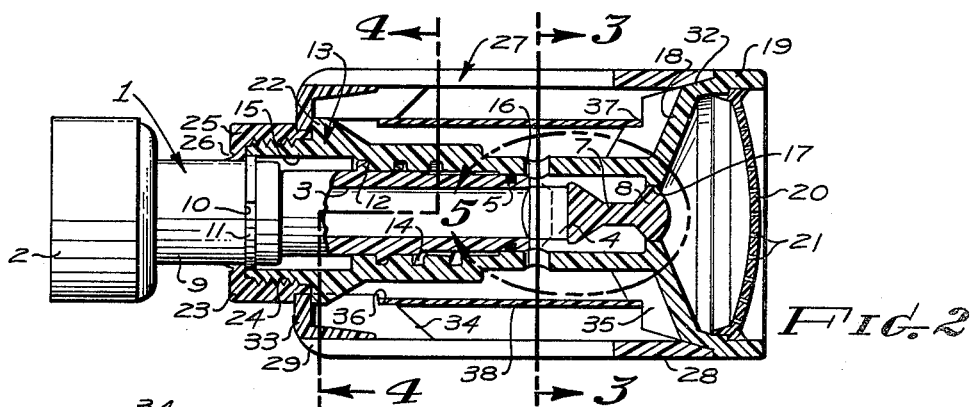
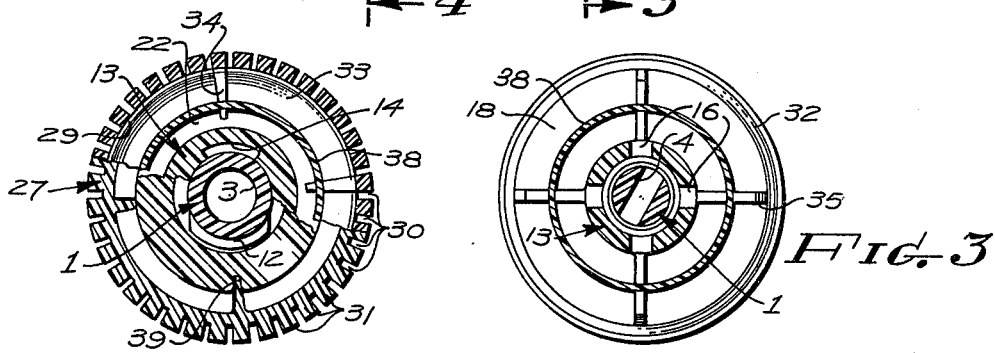
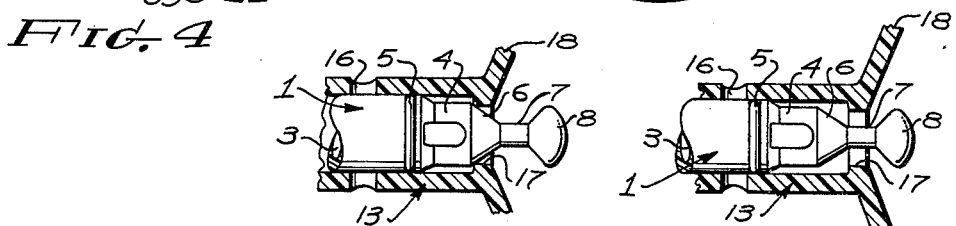
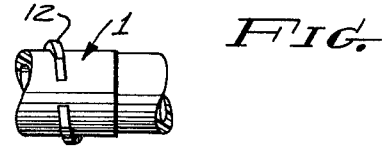
INVENTOR.
LUIGI PRENCIPE
BY
Lyon and Lyon
ATTORNEYS

United States Patent Office

3,502,270
Patented Mar. 24, 1970

3,502,270
WATER DISCHARGE CONTROL FOR GARDEN HOSES
Luigi Prencipe, 1408 Opal St.,
San Diego, Calif. 92109
Filed Feb. 19, 1968, Ser. No. 706,432
Int. Cl. A01g *25/00*
U.S. Cl. 239—458        7 Claims

ABSTRACT OF THE DISCLOSURE

A water discharge control adapted for attachment to a garden hose. A bubbler having discharge openings of large area and internal baffles and a spray head are longitudinally adjustable as a unit on a nozzle mandrel. A valve operable by the longitudinal adjustment of the unit directs flow through the spray head for forcible discharge of water, or through the bubbler for low pressure high volume flow therefrom, or effects complete shutoff.

SUMMARY OF THE INVENTION

This invention is directed to a water discharge control for garden hoses and included in the objects of this invention are:

First, to provide a water discharge control which permits water to be discharged forcibly as a spray, or which interferes with the flow so that the water discharges or bubbles from the control at minimal velocity and pressure, but at high volume.

Second, to provide a control of this type in which the bubbler and spray components are arranged as a unit on a nozzle mandrel and include a screwthread connection therewith for limited longitudinal movement thereon, this movement being utilized to direct water through the bubbler or the spray head, or to shut off the water.

Third, to provide a water discharge control of this type which incorporates a novelly arranged valve means so arranged that the nozzle mandrel may be molded in one piece while permitting the bubbler and spray head unit to be slipped axially on the mandrel, past the valve means.

Fourth, to provide a water discharge control which may, if desired, be made in its entirety of plastic molded parts capable of ready assembly.

DESCRIPTION OF FIGURES

FIGURE 1 is a side view of the water discharge control for garden hoses, shown adjusted to function as a bubbler, and indicating by dotted lines, its fully closed adjustment.

FIGURE 2 is a longitudinal, sectional view thereof, taken through 2—2 of FIGURE 1.

FIGURE 3 is a transverse, sectional view, taken through 3—3 of FIGURE 2, with the bubbler cage removed.

FIGURE 4 is a transverse, sectional view, taken through 4—4 of FIGURE 2.

FIGURE 5 is a fragmentary, sectional view, taken within circle 5 of FIGURE 2, showing the adjustment in order that the control may function as a spraying device.

FIGURE 6 is a similar fragmentary view, showing the control in its fully closed position.

FIGURE 7 is a fragmentary, side view of the nozzle mandrel, showing the partial screwthread thereon.

The water discharge control for garden hoses includes a nozzle mandrel 1, having a conventional adapter 2 at one end for connection to a garden hose. The nozzle mandrel has a longitudinal bore or water passage 3, which terminates in a pair of cross ports 4. The mandrel is provided at a point rearwardly of the cross ports 4 and adjacent thereto, with an external groove which receives an O-ring 5. Beyond the cross ports or forwardly thereof, the mandrel is tapered conically as indicated by 6, and forms at the apex end thereof, a reduced neck 7. The nozzle mandrel terminates in a valve head 8, smaller in diameter than maximum diameter of the conical portion 6.

Externally and adjacent the hose adapter, the mandrel forms a slightly enlarged cylindrical portion 9, having near its extremity, a snap ring groove 10, which receives a snap ring 11. Approximately midway between the cylindrical portion 9 and the O-ring 5, the nozzle mandrel is provided with helical ribs 12, which form an interrupted screwthread.

The mandrel receives a sleeve 13, having internal screwthreads 14, which engage the interrupted screwthread formed by the ribs 12, so that on rotation of the sleeve 13, it may be moved axially a limited distance on the mandrel. The end of the sleeve 13 confronting the enlarged cylindrical portion 9, is counterbored, as indicated by 15, to slide over the snap ring 11. The sleeve 13 is provided with lateral ports 16 located so that on axial adjustment of the sleeve the ports 16 pass over the O-ring 5, so that when the sleeve is in its extended position, the ports 16 communicate with the cross ports 4, and when in its retracted position, are sealed therefrom by the O-ring 5.

The sleeve extends beyond the lateral ports 16 and is provided with an axially directed valve port 17, dimensioned to slidably receive the valve head 8 when the sleeve is in its extended position. When the sleeve is partially retracted, as shown in FIGURE 5, the valve port is opposite the neck 7 and rearwardly of the valve head 8 so that water may flow through the valve port 17. When the sleeve is fully retracted, as shown in FIGURE 6, the axially inner margin of the valve port 17 functions as a valve seat by engaging the conical portion 6 which functions as a valve face.

The sleeve 13 is provided with a flared end 18 which extends outwardly and forwardly of the valve port 17, and terminates in a cylindrical rim 19. Mounted within the rim 19 is a spray disk 20, having a plurality of perforations 21.

Adjacent its rearward end, the sleeve 13 is provided with an external flange 22 and receives rearwardly of the flange 22, a retainer ring 23 connected to the sleeve by screwthreads 24. The retainer ring is provided with an internal flange 25, dimensioned to fit slidably on the cylindrical portion 9 of the mandrel 1, and is limited in its movement by engagement with the snap ring 11. The internal flange is provided with an axially extending wiper lip 26.

The sleeve 13 is encased in a cage 27, which includes a forward ring 28 and a rearward ring 29, between which extend a plurality of bars 30, forming therebetween exit slots 31. Internally, the extremity of the forward ring 28 is tapered and the flared end 18 of the sleeve is correspondingly tapered forming mating tapered faces, indicated by 32.

The rearward ring 29 of the cage 27 is provided with an internal flange 33, capable of being clamped between the retainer ring 23 and the flange 22 of the sleeve 13. Adjacent the internal flange, and within the rearward ring 29, the cage is provided with a set of axially extending centering ribs 34. Similarly, the rearward side of the flared end 18 is provided with axially extending centering ribs 35. At least some of the ribs are notched, as indicated by 36 and 37, to support the ends of a baffle cylinder 38. In order to restrain the cage against rotation relative to the sleeve 13 and thus provide a drive connection for rotating the sleeve, the flange 22 is provided with notches 39 which receive selected centering ribs 34.

Operation of the water discharge control for garden hoses is as follows:

When the assembly which includes the cage 27 and sleeve 13 is moved forwardly with respect to the mandrel 1 until the flange 25 engages the snap ring 11, as shown in FIGURE 2, the valve head 8 is disposed within the valve port 17, closing the valve port. When so adjusted, the water flows from the cross ports 4 through the ports 16, then around the axial ends of the baffle cylinder 38, and finally discharges through the slots 31. The pressure and hence the velocity of the water drops substantially so that although the water may flow in relatively large volume from the cage, its velocity is nominal, therefore the water does not have a jetting action. In this regard, it should be noted that the valve head 8 and valve port 17 need not form a perfect seal; that is, some leakage is permitted resulting in low velocity flow of the spray disk in the manner of the flow from the cage 27.

When it is desired to use the control as a spray device, the sleeve and cage are moved rearwardly on the mandrel as a unit so that the valve port 17 is opposite the neck 7, permitting the water to flow around the valve head 8 and discharge from the spray disk 20. In this regard, it should be noted that the valve head forms a baffle preventing a jetting of water at higher velocity through the central perforations in the spray disk 20. It will also be noted that when the control is used as a spraying device, the seal ring 5 is forward of the ports 16, preventing flow from the cage 27.

If the sleeve 13 and cage 27 are moved to their extreme rearward position relative to the mandrel 1, the conical valve face 6 engages the inward margin of the valve port 17 as indicated in FIGURE 6, shutting off flow from the mandrel.

The wiper lip 26 serves to keep dirt out of the interior of the sleeve. Also, as the ports 16 move past the O-ring 5, a spurt of water bypasses the O-ring and serves to flush the screwthreads as well as to provide lubrication.

While particular embodiments of this invention have been shown and described, it is not intended to limit the same to the details of the constructions set forth.

I claim:

1. A water discharge control for garden hoses, comprising:
   (a) a nozzle mandrel including means for attachment to a hose, means extending forwardly therefrom and defining a water passage terminating in side outlets, and means continuing forwardly of said bore and terminating in a valve head;
   (b) a sleeve axially movable on said nozzle mandrel and including radial ports communicating with said side outlets, and a flared end having a central aperture dimensioned to pass said valve head and form therewith a slide valve;
   (c) a perforated spray disk covering said flared end;
   (d) a cage having a plurality of discharge openings therein, joined to said flared end and extending over and joined to said sleeve in spaced relation to said flared end;
   (e) a baffle between said side outlets and said cage;
   (f) and means for moving said sleeve and cage as a unit axially on said mandrel to place said valve head forwardly of said central aperture for discharge of water from said spray disk, or within said aperture to divert water through said cage.

2. A control, as defined in claim 1, wherein:
   (a) said moving means is a screwthread connection between said mandrel and sleeve;
   (b) and a seal ring is provided between said mandrel and sleeve and between said screwthread connection and said radial ports.

3. A control, as defined in claim 1, wherein:
   (a) a set of mounting ribs extend from the back side of said flared end, and a second set of mounting ribs are disposed internally of said cage;
   (b) and said baffle is cylindrical in form and supported at its ends by said ribs.

4. A control, as defined in claim 2, wherein:
   (a) said mandrel also includes a valve face engageable with the margins of said central aperture and thereby, in cooperation wth said seal ring, close off flow from said side outlets.

5. A water discharge control for garden hoses, comprising:
   (a) a nozzle mandrel including means at its rear end for attachment to a hose; a water passageway within said mandrel terminating in side outlets near its forward end; and a valve face adjacent said side outlets;
   (b) a sleeve axially movable on said nozzle mandrel, said sleeve including radial ports communicating with said side outlets, and a valve seat cooperating with said valve face;
   (c) a perforated cage surrounding said sleeve and joined at its ends thereto to define an annular chamber closed at its ends and surrounding said sleeve for radial discharge through said cage of water passing said radial ports;
   (d) baffle means between said side outlets and the perforations in said cage;
   (e) and means for advancing and retracting said sleeve relative to said mandrel to open and close said radial ports, thereby to control flow from said cage.

6. A control, as defined in claim 5, which further comprises:
   (a) a spray unit as the forward extremity of said sleeve;
   (b) and a valve head at the forward extremity of said mandrel movable through said valve seat to control flow of water from said spray unit.

7. A water discharge control for garden hoses, comprising:
   (a) a nozzle mandrel including means for attachment to a hose, means extending forwardly therefrom and defining a water passage terminating in side outlets, and means continuing forwardly of said bore and terminating in a valve head;
   (b) a sleeve axially movable on said nozzle mandrel and including radial ports communicating with said side outlets, and an end having a central aperture for cooperation with said valve head to form a nozzle;
   (c) a cage having a plurality of discharge openings therein, joined to said flared end and extending over and joined to said sleeve in spaced relation to said flared end;
   (d) a baffle between said side outlets and said cage;
   (e) and means for moving said sleeve and cage as a unit axially on said mandrel for discharge of water from said nozzle or to close said nozzle thereby to divert water through said cage.

References Cited

UNITED STATES PATENTS

| | | | |
|---|---|---|---|
| 599,967 | 3/1898 | Laws | 239—458 |
| 2,333,767 | 11/1943 | Davis | 239—449 |
| 3,058,670 | 10/1962 | Marotto et al. | 239—542 |
| 3,221,996 | 12/1965 | Emmert et al. | 239—542 |
| 3,363,842 | 1/1968 | Burns | 239—449 |
| 3,430,867 | 3/1969 | Rodgers et al. | 239—542 |

EVERETT W. KIRBY, Primary Examiner

U.S. Cl. X.R.

239—460, 542